United States Patent [19]

Morby

[11] Patent Number: 5,550,678
[45] Date of Patent: Aug. 27, 1996

[54] FOCUSSING COLLIMATOR OF THE PLATZ-HEINZELMANN TYPE AND METHOD OF MAKING PLATZ-HEINZELMANN TYPE COLLIMATORS

[75] Inventor: Derek J. Morby, Streamwood, Ill.

[73] Assignee: Siemens Medical Systems, Inc., Iselin, N.J.

[21] Appl. No.: 213,296

[22] Filed: Mar. 14, 1994

[51] Int. Cl.⁶ .............................. G02B 27/30; H04N 7/18; B23P 19/04
[52] U.S. Cl. .............................. 359/641; 348/147; 29/238
[58] Field of Search .................... 359/641; 250/505.1, 250/517.1; 378/147, 148; 29/238

[56] References Cited

U.S. PATENT DOCUMENTS

| | | | |
|---|---|---|---|
| 3,379,594 | 4/1968 | Bruder | 29/238 |
| 3,943,366 | 3/1976 | Platz | 250/505 |
| 4,056,427 | 11/1977 | York | 156/580 |
| 4,465,540 | 8/1984 | Albert | 359/641 |
| 4,958,081 | 9/1990 | Malmin | 250/505.1 |

OTHER PUBLICATIONS

In re Leshin, 125 USPQ 416.

Primary Examiner—Georgia Y. Epps
Assistant Examiner—Ricky Mack
Attorney, Agent, or Firm—Mark H. Jay

[57] ABSTRACT

A Platz-Heinzelmann collimator is produced by introducing strips of material between the dies of a die press, heating the material to below its extrusion temperature, applying pressure, removing the strips and adhesively securing them together.

The collimator may be of the focussing type.

5 Claims, 3 Drawing Sheets

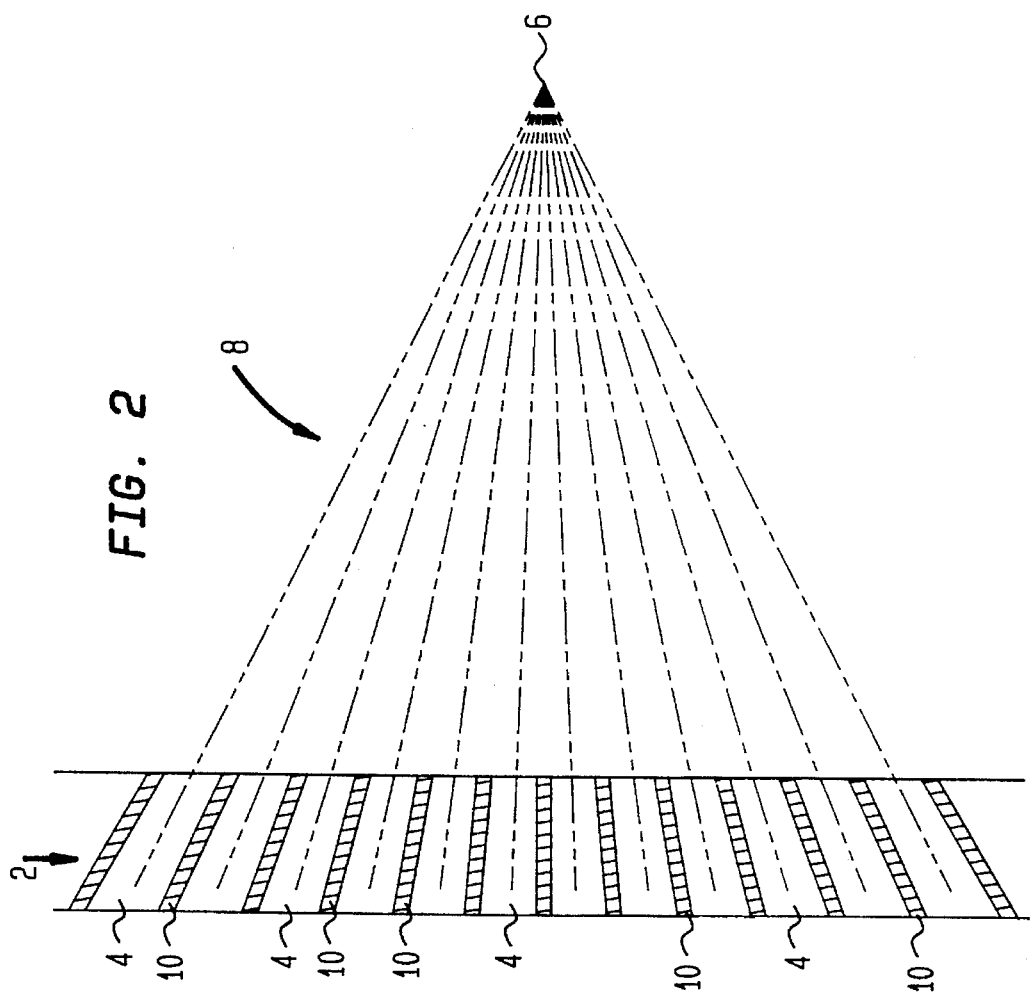
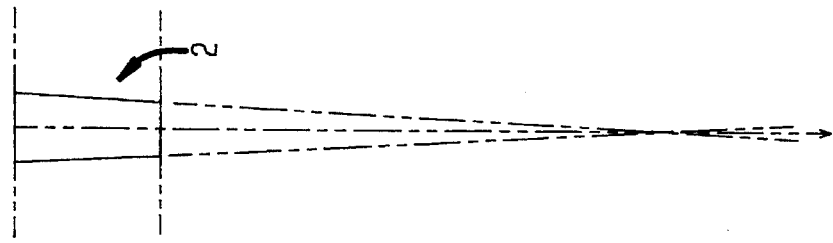

FOCUSSING COLLIMATOR OF THE PLATZ-HEINZELMANN TYPE AND METHOD OF MAKING PLATZ-HEINZELMANN TYPE COLLIMATORS

BACKGROUND OF THE INVENTION

The invention relates to collimators, and more particularly relates to focussing collimators made up of metal foil. In its most immediate sense, the invention relates to focussing collimators of the Platz-Heinzelmann type.

U.S. Pat. No. 3,943,366 to Platz and Heinzelmann discloses a collimator which is made up of strips of lead foil. The strips are adhesively secured together. The strips are not of uniform thickness; as is stated at column 2, lines 63–64, the thickness of the sections 28 is half that of the sections which immediately adjoin them. This dimensioning creates a honeycomb-type structure in which the total thickness of the septa separating the collimator channels is everywhere generally constant. As used herein, the term "Platz-Heinzelmann-type collimator" means a collimator which is built up from adhered-together strips of material and which has a generally constant septum thickness.

The referenced patent discloses that strips of lead foil are heated (as by an induction coil, see column 1, lines 61–63) and then introduced between two mating gears as shown in FIG. 3. These gears produce corrugated lead foil strips which are later glued together to form the core of a parallel-hole (or nonfocussing) collimator.

The method disclosed in the referenced patent is not suitable for producing focussing collimators (e.g. collimators of the cone-beam, fan-beam, astigmatic and multifocal types). This is because focussing collimators cannot be made up from lead foil strips having a corrugation pattern which remains invarient from one end to the other. It is not practical to cut mating gears so as to produce lead foil strips which, when assembled together, will form collimators of the focussing type.

Focussing collimators made of corrugated lead foil are conventionally stamped to an appropriate shape in a die press. Such a method is unsuitable for manufacturing collimators of the Platz-Heinzelman type. This is because extremely high pressures would be needed to compress the strips to half-thickness at the proper location. Conventional die press equipment is not capable of producing strips of appropriate dimensional precison at the pressures which would be required.

As a result, conventional focussing collimators are not of the Platz-Heinzelmann type and Platz-Heinzelmann-type collimators are not of the focussing type.

It would be advantageous to provide a focussing collimator of the Platz-Heinzelmann type. It would also be advantageous to provide a method for manufacturing focussing collimators of the Platz-Heinzelmann type.

One object of the invention is to produce a focussing collimator of the Platz-Heinzelmann type.

Another object is to provide a method for manufacturing a focussing collimator of the Platz-Heinzelmann type.

Still another object is to provide an improved method for manufacturing Platz-Heinzelmann-type collimators.

Yet another object is, in general, to improve on known collimators and methods by which they are manufactured.

In accordance with the apparatus aspects of the invention, there is provided a focussing collimator of the Platz-Heinzelmann type. In accordance with the method aspects of the invention, strips of material are heated to below the extrusion temperature of the material from which they are made. This permits strips suitable for use in Platz-Heinzelmann-type collimators to be manufactured using only slightly elevated pressures. Advantageously, the material is an alloy containing a preponderance of lead and the strips are coated with a high temperature post-processable mold release agent before they are heated.

BRIEF DESCRIPTION OF THE DRAWINGS

The invention will be better understood with reference to the following illustrative and non-limiting drawings, in which:

FIGS. 1 and 2 schematically show a lead foil strip of the type conventionally used to manufacture a cone-beam collimator;

DETAILED DESCRIPTION OF PREFERRED EMBODIMENTS

Figure 3:
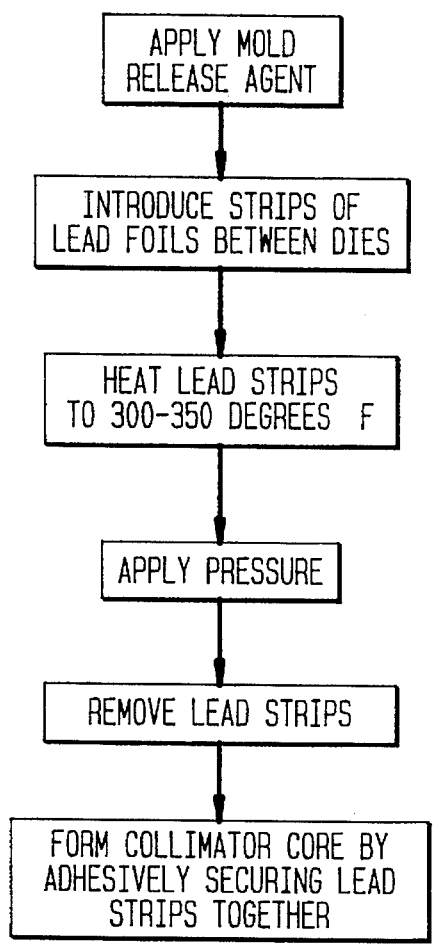
FIG. 3 is a flow chart of a preferred method in accordance with the invention.

The various Figures are not to scale. The following description applies to collimators such as are used with scintillation cameras of the type used for diagnostic medical imaging applications, but this is not a part of the invention.

FIGS. 1 and 2 show, respectively, an elongated strip generally indicated by reference numeral 2 on end and from the side. The strip 2 is of generally constant thickness, and is advantageously an alloy containing a predominance of lead. The strip 2 has a plurality of channels 4 which are all aimed at a common focal point 6. This forms a two-dimensional fan beam generally indicated by reference numeral 8.

The channels are separated by corrugations 10. In a conventional focussing collimator, the collimator core is built up by adhesively securing a plurality of strips 2 together such that the corrugations 10 of one strip 2 touch the corrugations 10 of an adjacent strip 2. Since the strips 2 are of generally constant thickness, this produces a honeycomb pattern in which the septa formed by two adjacent corrugations 10 are twice as thick as the other septa.

In accordance with a preferred embodiment of a method in accordance with the invention as illustrated in FIG. 3, the dies of a conventional die press are formed to produce a focussing collimator of the Platz-Heinzelmann type, i.e. of the type built up from adhered-together strips and having a generally constant septum thickness. (The dies themselves are conventional.) Also in accordance with the invention, strips 2 of material are introduced between the dies. To prevent the strips 2 of material from sticking to the dies after application of heat and pressure, a mold release agent may advantageously be used, but this is not required. For convenience, the mold release agent should be of the high-temperature post-processable type, i.e. should withstand the temperatures reached in the die press and should adhere with paint and/or adhesives so that the mold release agent need not be removed before adhesively securing the strips 2 together or before painting the finished collimator core.

While the strips 2 are located between the dies, the strips 2 are heated to below the extrusion temperature of the material from which they are made. (This may advantageously be accomplished by heating the dies using electricity, but the method by which heating is accomplished is not a part of the invention.)

Figure 4:
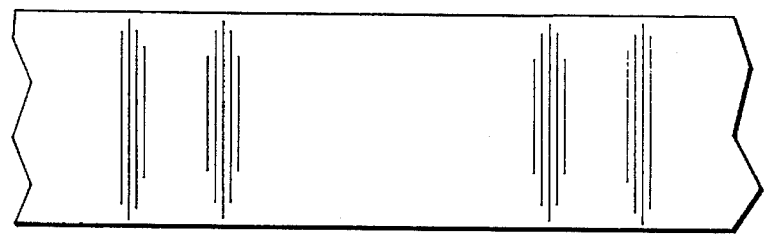
FIGS. 4 and 5 schematically show a lead foil strip produced in accordance with the invention.
Figure 5:
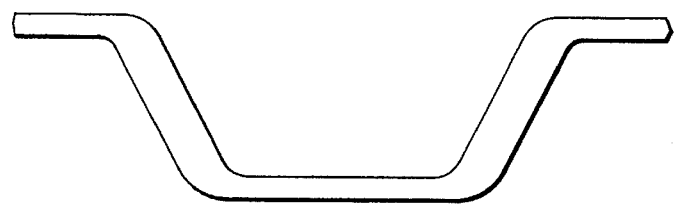

Once the strips 2 have been heated to an appropriate temperature, the dies are pressed together. The elevated temperature of the strips 2 reduces, by a factor of approximately 150, the pressure necessary to produce strips 2 suitable for manufacturing Platz-Heinzelmann-type collimators. After this pressure has been applied, the corrugations 10 are thinned out so as to be about half the thickness of the other regions of the strips 2 (see FIGS. 4 and 5). Thereafter, the dies are opened and the strips 2 are removed and glued together to form a collimator core for a focussing collimator of the Platz-Heinzelmann type.

Figure 6:
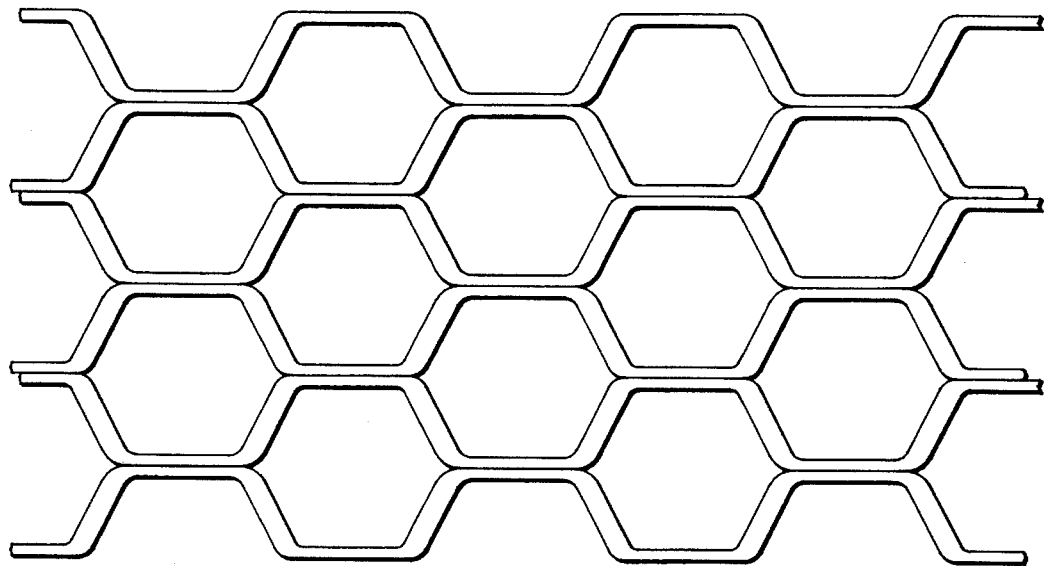
FIG. 6 schematically illustrates a portion of a core of a collimator in accordance with the invention.

FIG. 6 schematically illustrates how a section of such a core might appear. FIG. 6 was taken from a section of a collimator core for a nonfocussing (parallel-hole) collimator of the Platz-Heinzelmann type, but the tiny differences in inclination between adjacent channels which would exist in a focussing Platz-Heinzelmann-type collimator would not be visually apparant. Thus, FIG. 6 not only illustrates the appearance of a small section from the core of a parallel-hole collimator of the Platz-Heinzelmann type, but also illustrates the appearance a small section from the core of a focussing collimator of the Platz-Heinzelmann type as well.

For nuclear medicine applications, the material used for the strips 2 is advantageously an alloy which is predominently of low background virgin lead and which also contains 2.4%–2.6% antimony and 1.4%–1.6% tin. This is not a part of the invention and other materials may be used instead. Advantageously, the strips 2 of this alloy are 0.0075" thick, but thicknesses between 0.005" and 0.157" can be used, and the thickness of the strips 2 is likewise not a part of the invention. The material employed is determined by the radioisotope(s) for which the finished collimator is to be used and the thickness of the material is determined by the application intended.

For strips 2 made in accordance with the preferred embodiment, the extrusion temperature is approximately 400° F. to 450° F. and the strips 2 are advantageously heated to about 300° F. to 350° F. This has produced satisfactory results, but is not necessary to the practice of the invention; a different temperature range may be used instead.

Suitable mold release agents are halogenated hydrocarbon/ether blends and dimethypolysiloxane, but the type of mold release is not a part of the invention and other materials can be used instead. While in accordance with the preferred embodiment the strips 2 are coated with mold release agent before they are introduced between the dies, this is not required. The mold release agent may alternatively be applied to the dies or to the dies and the strips 2; this is a matter of convenience and is not a part of the invention.

Advantageously, the adhesive used to construct the collimator core is EURROLON 2130 epoxy, but this is not a part of the invention and any other suitable adhesive (usually, this would be an epoxy) may be used instead. Advantageously, the adhesive is sprayed on the strips 2, but the method of application is likewise not a part of the invention.

Although a preferred embodiment has been described above, the scope of the invention is limited only by the following claims:

I claim:

1. A method of manufacturing a Platz-Heinzelmann collimator, comprising the following steps:

setting up a die press with mating die sections which are so dimensioned as to produce one or more collimator strips having appropriate dimensions for a Platz-Heinzelmann collimator;

introducing elongated strips of material between the coated die sections;

heating the elongated strips of material to a temperature which is less than the extrusion temperature of the material;

applying pressure to the elongated strips of material after they have been so heated;

removing the pressed elongated strips from between the die sections; and forming a Platz-Heinzelmann collimator from the strips so removed.

2. The method of claim 1, wherein said forming step comprises the steps of applying adhesive to the strips and stacking the adhesive-bearing strips to form collimator cores.

3. The method of claim 1, wherein the material is predominantly lead, wherein the temperature is approximately 300° F. to 350° F. and the mold release agent is of a post-processable type.

4. The method of claim 2, wherein the adhesive is an epoxy.

5. A focussing collimator which is built up from adhered together strips of material and which has a substantially constant septum thickness.

* * * * *